Patented Dec. 23, 1930

1,785,930

UNITED STATES PATENT OFFICE

THEODORE F. BRADLEY, OF WESTFIELD, NEW JERSEY, ASSIGNOR TO ELLIS-FOSTER COMPANY, OF MONTCLAIR, NEW JERSEY, A CORPORATION OF NEW JERSEY

RESINOUS COMPOSITION AND PROCESS OF MAKING SAME

No Drawing.   Application filed June 5, 1925.   Serial No. 35,264.

This invention relates to new resinous compositions and process of making the same. These resinous compositions are suitable for use in nitrocellulose coating compositions such as are used for the preparation of artificial leather, automobile lacquers and other types of lacquers and lacquer enamels having a nitrocellulose base.

These resinous compositions may be made by chemically combining phthalic anhydride, glycerol and castor oil. Products of many degrees of hardness may be obtained according to the relative proportion of castor oil employed. Polybasic acids other than phthalic anhydride, such as tartaric, citric, malic and maleic acids may be used to wholly or partially replace the same, polyhydric alcohols other than glycerol such as ethylene and propylene glycols and oils containing hydroxylated fatty acids other than castor oil such as quince oil. In some cases I may also utilize monobasic acids such as benzoic, lactic and similar acids. I may also utilize such natural acidic materials as rosin, but in the preferred procedure I utilize to best advantage glycerol, phthalic anhydride and castor oil. The castor oil which I preferably employ is known as the Grade AA medicinal quality raw oil, although I may also utilize the blown castor oils, partially hydrogenated castor oils, ordinary raw oil of any grade and refined or bleached oils. By using a good grade of refined oil I am able to produce a lighter colored resin than can be produced with any of the oils mentioned. It is the object of my invention to produce resins and resinous softeners of low acidity, soluble in ethyl and butyl acetates (or mixtures of these acetates with their corresponding alcohols) and other nitrocellulose solvents, completely miscible and compatible with nitrocellulose, both in solution and in the dried film obtained therefrom. In some cases my object also is to produce resins of extremely light color where such color is deemed of value.

In accordance with my invention a complex resinous substance is formed by reacting simultaneously at an elevated temperature a mixture of glycerol, phthalic anhydride and castor oil. The reaction is preferably conducted in a suitable container equipped with a reflux condenser of such size and construction as will tend to eliminate water and other similar volatile material while at the same time preventing the loss of glycerol and phthalic anhydride. In my preferred precedure mechanical agitation is employed throughout the reaction. The preferred procedure is to load the kettle with all materials and melt the same, agitation then being employed. The temperature is then taken slowly to about 290° C. and should never exceed 300° C. Temperatures above 200° C. may in some cases be sufficient to produce satisfactory resins but where such low temperatures are employed the time taken to complete the reaction is such as to greatly increase the cost of the product. Another feature is that at temperatures above 230° C. the castor oil readily enters into combination, whereas at lower temperatures the combination is so slow as to at times permit a combination of the phthalic anhydride with the glycerol and formation of an insoluble phthalic glyceride polymer before the castor oil can enter into reaction and prevent this polymerization. I therefore prefer to use temperatures substantially above 200° C. and not exceeding 300° C. In all cases I prefer to use oils of natural acidity since the use of rancid or acid oils has been found to produce darker colored resins than are usually desired. Tests should be made from time to time until the acid number is sufficiently lowered. The batch may then be cooled and the material poured into suitable containers. The acidity of the final product is regulated by the relative amounts of reacting substances employed and by the length of heating and temperature of reaction. In most cases it is advisable to produce a resinous material having an acid number substantially not exceeding 30, since lacquers made from resins of greater acidity have often been found to tarnish brass.

Although the relative proportions of reacting substances may be varied over a wide range I believe that a definite chemical union of phthalic anhydride, glycerol and castor oil is obtained. This seems evident when it is observed that phthalic anhydride and glycerol when combined alone to form a fusible resin produces a product which is insoluble in ethyl or butyl acetates (or mixtures of these acetates and corresponding alcohols) is relatively high in acidity, the acid number of such material ranging from 70 to 180 and such resin is found to be immiscible with castor oil and nitrocellulose. The reaction product of glycerol phthalic anhydride and castor oil or their equivalents are soluble in ethyl and butyl acetates or mixtures of these acetates and their corresponding alcohols and are of considerably lower acidity, are miscible and compatible with nitrocellulose. Furthermore it should be noted that in certain cases glycerol, phthalic anhydride and castor oil combine to form a resin which when dissolved and incorporated with nitrocellulose does not mix with further quantities of castor oil added in the usual way as a softening or plasticizing agent for the nitrocellulose, the addition of such castor oil causing the formation of opaque and non-homogeneous films. If however another type of softener such as diethylphthalate be substituted a clear homogeneous film is obtained. Thus it will be seen that the castor oil may be chemically combined at relatively high temperatures with the phthalic anhydride and glycerol but cannot be combined therewith by merely blending cold in solution.

I will now illustrate my invention by describing in detail several specific resinous compositions made by my process and suitable for use in nitrocellulose coatings.

Hard resin A 74 parts phthalic anhydride, 45 parts glycerol, 33 parts castor oil. The equivalent in grams of this formula was made in the laboratory in a glass flask using mechanical agitation and under suitable reflux condenser, carrying the temperature to 290° C. in 1½ hours. The resin obtained was pale in color, had an acid number of 20.6 and a softening point of 65° C. (ball and ring method). This resin was found to be soluble in a mixture of 60 parts butyl acetate and 40 parts butyl alcohol although not completely soluble in straight butyl acetate.

Resin B (resinous softener)

47 parts of glycerol, 98 per cent C. P., 30 parts of phthalic anhydride, 90 parts of castor oil. This resin was made in the same manner as resin A and produced an extremely soft resinous material having an acid number of 14.3 and which was freely soluble in butyl and ethyl acetates.

Soft resin C 47 parts glycerol, 98 per cent C. P., 111 parts phthalic anhydride, 140 parts castor oil.
This resin was also made in the same manner as resin A and produced a rather soft, sticky resin having an acid number of 48.2. This product was freely soluble in ethyl and butyl acetates.

Many variations in proportions are permissible according to the nature of the product desired that is the relative degree of hardness, color, solubility and acidity and I therefore do not limit myself to any specific proportions, merely giving the foregoing as illustrative examples.

The many types of resinous compositions which can be produced from these reactions are of great importance to the nitrocellulose coating industries for it now becomes possible to produce materials of from liquid nature to hard and tough solids, all of which are miscible and compatible with nitrocellulose. More of these softer types of compositions than of ordinary castor oil may be admixed with nitrocellulose thus rendering possible the production of more flexible and longer wearing artificial leathers and similar compositions. The elimination of castor oil odors and of rancidifying oils from the artificial leather also constitutes an important advance in the industry.

What I claim is:—

1. A process which comprises heating a mixture of a polyhydric alcohol, a polybasic carboxylic acid and the glyceride of a hydroxylated fatty acid to a temperature of about 290° C.

2. A process which comprises heating a mixture of a polyhydric alcohol, a polybasic acid and the glyceride of a hydroxylated fatty acid to a temperature between 230 and 290° C.

3. A process which comprises heating a mixture of a polyhydric alcohol, a polybasic acid and the glyceride of a hydroxylated fatty acid to a temperature greater than 200° C., and not above 300° C.

4. A process which comprises heating a mixture of glycerol, phthalic anhydride and castor oil to a temperature of about 290° C.

5. A process which comprises heating a mixture of glycerol, phthalic anhydride and castor oil to a temperature between 230 and 290° C.

6. A process which comprises heating a mixture of glycerol, phthalic anhydride and castor oil to a temperature greater than 200° C., and not above 300° C.

7. A process which comprises heating a mixture of a polyhydric alcohol, a polybasic acid, a monobasic acid and the glyceride of a hydroxylated fatty acid to a temperature of about 290° C.

8. A process which comprises heating a mixture of a polyhydric alcohol, a polybasic acid, a monobasic acid and the glyceride of a hydroxylated fatty acid to a temperature between 230 and 290° C.

9. A process which comprises heating a mixture of a polyhydric alcohol, a polybasic acid, a monobasic acid and the glyceride of a hydroxylated fatty acid to a temperature greater than 200° C., and not above 300° C.

10. A process which comprises simultaneously chemically combining a polybasic acid, a polyhydric alcohol and the glyceride of a hydroxylated fatty acid.

11. A process which comprises simultaneously chemically combining phthalic anhydride, glycerol and castor oil.

12. A process which comprises simultaneously chemically combining a polybasic carboxylic acid, a monobasic acid, a polyhydric alcohol and the glyceride of a hydroxylated fatty acid.

13. A process which comprises simultaneously chemically combining phthalic anhydride, benzoic acid, glycerol and castor oil.

14. A resinous softener made by chemically combining a polybasic acid, a polyhydric alcohol and the glyceride of a hydroxylated fatty acid, the glyceride of the hydroxylated fatty acid being present in excess by weight of the polybasic acid.

15. A resinous softener made by chemically combining castor oil, phthalic anhydride and glycerol, the castor oil being present in excess by weight of the phthalic anhydride.

16. A resinous softener made by chemically combining a polybasic acid, a monobasic acid, a polyhydric alcohol and the glyceride of a hydroxylated fatty acid, the glyceride of the hydroxylated fatty acid being present in excess by weight of the monobasic acid.

17. A resinous softener made by chemically combining castor oil, phthalic anhydride, benzoic acid and glycerol, the castor oil being present in excess by weight of the phthalic anhydride.

18. A resinous composition made by simultaneously chemically combining a polybasic acid, a polyhydric alcohol and the glyceride of a hydroxylated fatty acid which is light in color, having an acid number not substantially over 30 and which is both miscible and compatible with nitrocellulose.

19. A resinous composition made by simultaneously chemically combining phthalic anhydride, glycerol and castor oil which is light in color, having an acid number not substantially over 30 and which is both miscible and compatible with nitrocellulose.

20. A resinous composition made by simultaneously chemically combining a polybasic acid, a monobasic acid, a polyhydric alcohol and a glyceride of a hydroxylated fatty acid having an acid number not substantially over 30 and which is both miscible and compatible with nitrocellulose.

21. A process as set forth in claim 2 wherein the mixture is agitated during the reaction.

22. A process as set forth in claim 10 wherein a refined glyceride is utilized.

23. A process as set forth in claim 11 in which blown castor oil is utilized.

24. A resinous reaction product such as that produced by the process of claim 3.

25. A resinous reaction product such as that produced by the process of claim 10.

26. A resinous reaction product such as that produced by the process of claim 11.

27. A resinous reaction product such as that produced by the process of claim 14.

28. A process which comprises heating a mixture of glycerol, phthalic anhydride, rosin and castor oil to a temperature of about 290° C.

29. A process which comprises simultaneously chemically combining phthalic anhydride, glycerol, rosin and castor oil.

30. A resinous softener made by chemically combining castor oil, phthalic anhydride, rosin and glycerol, the castor oil being present in excess by weight of the phthalic anhydride.

31. A resinous composition made by simultaneously chemically combining phthalic anhydride, glycerol, rosin and castor oil having an acid number not substantially over 30 and which is both miscible and compatible with nitrocellulose.

THEODORE F. BRADLEY.